United States Patent [19]

Zegarski

[11] Patent Number: 5,064,729
[45] Date of Patent: Nov. 12, 1991

[54] PROCESS OF PREPARING TANTALATE X-RAY INTENSIFYING PHOSPHORS WITH IMPROVED EFFICIENCY

[75] Inventor: William J. Zegarski, Towanda, Pa.

[73] Assignee: E. I. du Pont de Nemours and Company, Wilmington, Del.

[21] Appl. No.: 627,991

[22] Filed: Dec. 17, 1990

[51] Int. Cl.$^5$ ............................ G03C 5/17; G21K 4/00
[52] U.S. Cl. ............................ 428/690; 252/301.4 H; 252/301.4 R; 250/483.1
[58] Field of Search ...................... 428/690; 250/483.1; 252/301.4, 301.5, 301.4 H, 301.4 F, 304.4 R

[56] References Cited

U.S. PATENT DOCUMENTS 3,650,975  3/1972  Yale ........................ 452/301.4 F
4,225,653  9/1980  Brixner ........................ 428/539

Primary Examiner—James J. Seidleck
Assistant Examiner—Charles R. Nold

[57] ABSTRACT

A process for preparing X-ray intensifying M' monoclinic tantalate phosphors by firing precursor oxides in a novel flux mixture containing a compound capable of producing an alkali metal oxide and an effective amount of an alkali metal metasilicate. Tantalate phosphors made in this manner have improved efficiency and purity. X-ray intensifying screens made from these phosphors have improved speed and can be used with good results with a plurality of X-ray film elements.

10 Claims, 3 Drawing Sheets

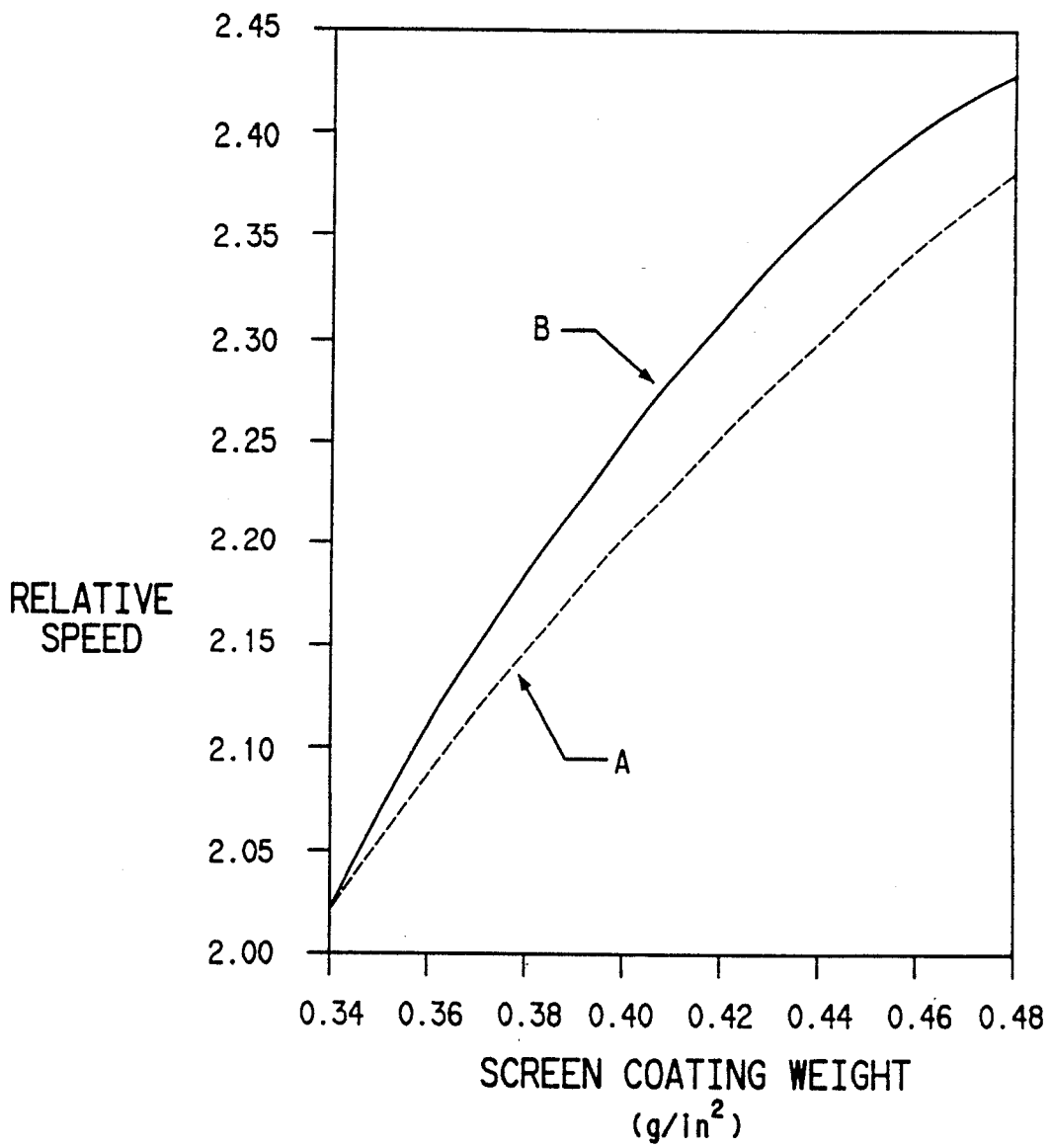

PROCESS OF PREPARING TANTALATE X-RAY INTENSIFYING PHOSPHORS WITH IMPROVED EFFICIENCY

FIELD OF THE INVENTION

This invention relates to a process for preparing luminescent phosphor materials. More particularly this invention relates to a process for preparing X-ray intensifying phosphors with improved efficiency.

BACKGROUND OF THE INVENTION

X-ray intensifying screens are generally used in conjunction with silver halide photographic films and serve to enhance the image formed on that film. Phosphors, which are the active component of X-ray screens, are legion in number and include the tungstates, the oxysulfides, and the oxybromides, among others.

Particularly efficient phosphors which may be used in the preparation of an X-ray intensifying screen are the tantalates described by Brixner in U.S. Pat. No. 4,225,623. These phosphors are based on yttrium, lutetium, and gadolinium tantalates of the M' monoclinic form and are generally activated with rare earths such as terbium, thulium and niobium, for example, as well described in the aforementioned reference. Since these phosphors have a high X-ray stopping power, they are presently widely used for the preparation of these intensifying screens and the method for their preparation includes the mixing of ingredients followed by firing this mixture to form the phosphor crystal lattice itself.

During this firing step it is often beneficial to use a flux which usually forms a partial liquid at the elevated temperatures commonly used. Thus, the flux can be thought of as a fluid in which the various component parts of the phosphor react to form the phosphor. These fluxes are generally alkali metal salts which are then removed from the reaction mixture by washing. Commonly fluxes include: $Li_2SO_4$, pure LiCl, $BaCl_2$, $SrCl_2$, known and mixtures of two of these salts, for example. Some fluxes are better to use than others since at the elevated temperature in which the phosphor is fired, some of the halide salts will vaporize and corrode the equipment. Lithium sulfate may decompose at these temperatures to give lithium oxide and oxides of sulfur. Lithium oxide is very reactive and can form lithium tantalate and/or lithium niobate in the phosphor oxide mixture. Lithium tantalate and niobate, however, are not as efficient as, for example, the yttrium compounds when used as X-ray phosphors. Thus, there is a need to find better flux systems for the preparation of X-ray intensifying phosphors.

The use of a rare earth oxide phosphor containing alkali metal silicates and germanates, is also known. In this particular case, however, the silicate is used as an integral mixture with the phosphor itself and it is reported that the brightness of the rare earth oxide phosphor is increased. The phosphors produced by this technique are not X-ray intensifying phosphors, but are red-emitting phosphors used in cathode ray tubes, for example.

It is an object of this invention to provide a tantalate phosphor of the M' monoclinic form with improved phosphor efficiency and purity which are achieved by reducing the level of contaminants in the phosphor reaction mixture.

SUMMARY OF THE INVENTION

In accordance with this invention there is provided a process for preparing a phosphor with improved X-ray efficiency and purity prepared from a tantalate phosphor having the monoclinic M' structure selected from the group consisting of:
(a) $YNb_xTa_{1-x}O_4$, where x is 0 to about 0.15;
(b) $LuNb_xTa_{1-x}O_4$, where x is 0 to about 0 20;
(c) $Y_{1-y}Tm_yTaO_4$, where y is Q to about 0.03;
(d) a solid solution of (a) and (b);
(e) a solid solution of (a) and (c);
(f) $Y_{1-y}Tb_yTaO_4$, where y is about 0.001 to about 0.15;
(g) $Lu_{1-y}Tb_yTaO_4$, where y is about 0.001 to about 0.15;
(h) $Gd_{1-y}Tb_yTaO_4$, where y is about 0.001 to about 0.15;
(i) a solid solution of at least two of (f), (g) and (h);
(j) any of (a) to (i) wherein up to 45 mole percent of the yttrium, lutetium or gadolinium is replaced by lanthanum;
(k) any of (a) to (i) wherein up to 15 mole percent of the yttrium, lutetium or gadolinium is replaced by ytterbium; and
(l) any of (a), (b), (c), (d) and (e) wherein up to 15 mole percent of the yttrium or lutetium is replaced by gadolinium;

the process comprising
(a) intimately mixing stoichiometric quantities of corresponding precursor oxides;
(b) mixing the resultant mixture with a flux capable of producing an alkali metal oxide wherein said flux also contains an effective amount of an alkali metal metasilicate;
(c) firing the flux-containing mixture in an inert container in the range of about 1100° C. to about 1400° C. for at least about 3 hours; and
(d) recovering the phosphor.

BRIEF DESCRIPTION OF THE DRAWINGS

The accompanying Figures form a material part of this disclosure wherein:

FIG. 3 is a plot similar to FIG. 1 but using niobium activated yttrium tantalate phosphor.

DETAILED DESCRIPTION OF THE INVENTION

Figure 1:
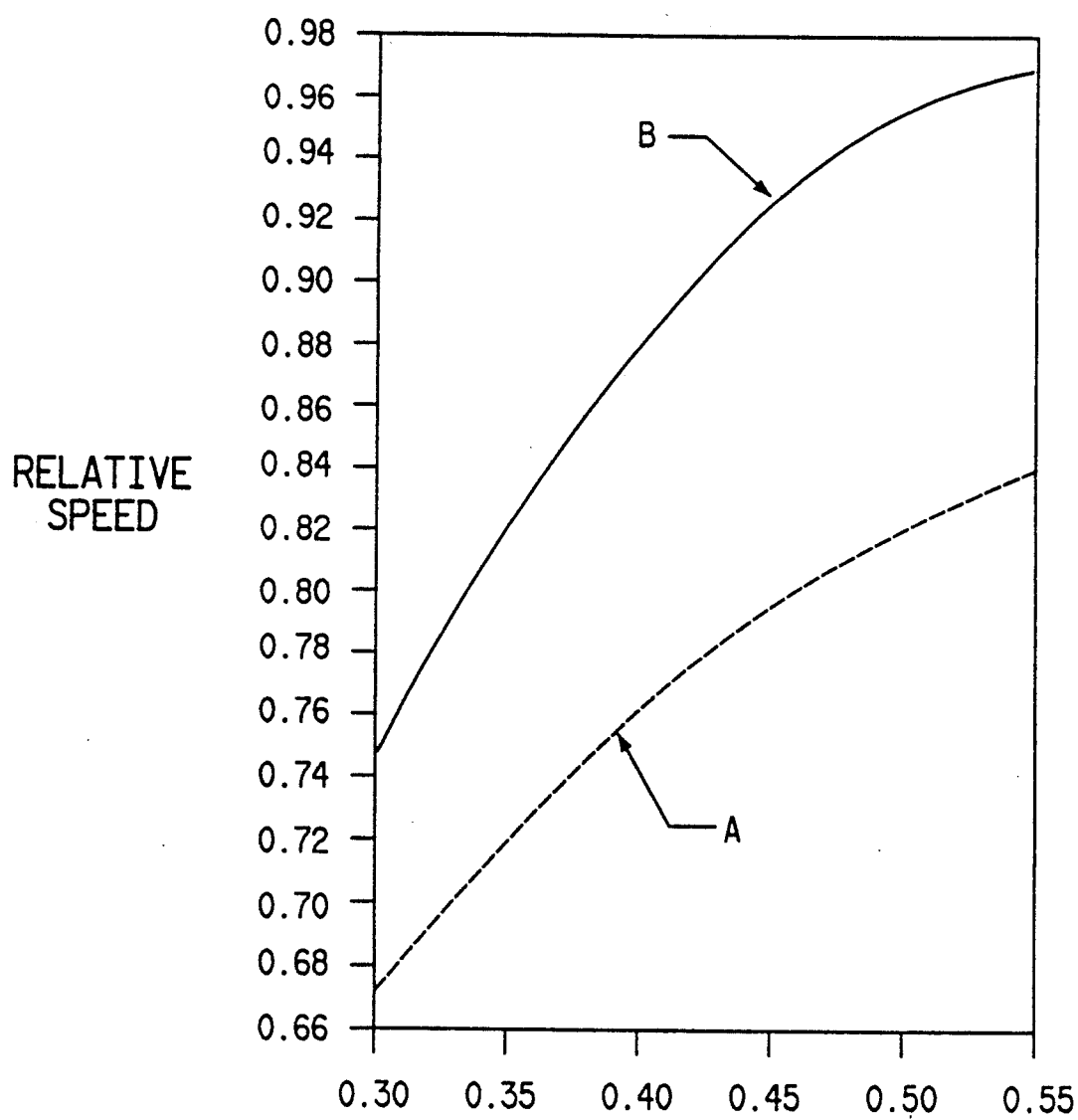
FIG. 1 is a plot of screen coating weight vs. relative speed of the phosphor prepared using a flux of the prior art, A, and the flux of this invention, B, for terbium activated yttrium tantalate.
Figure 2:
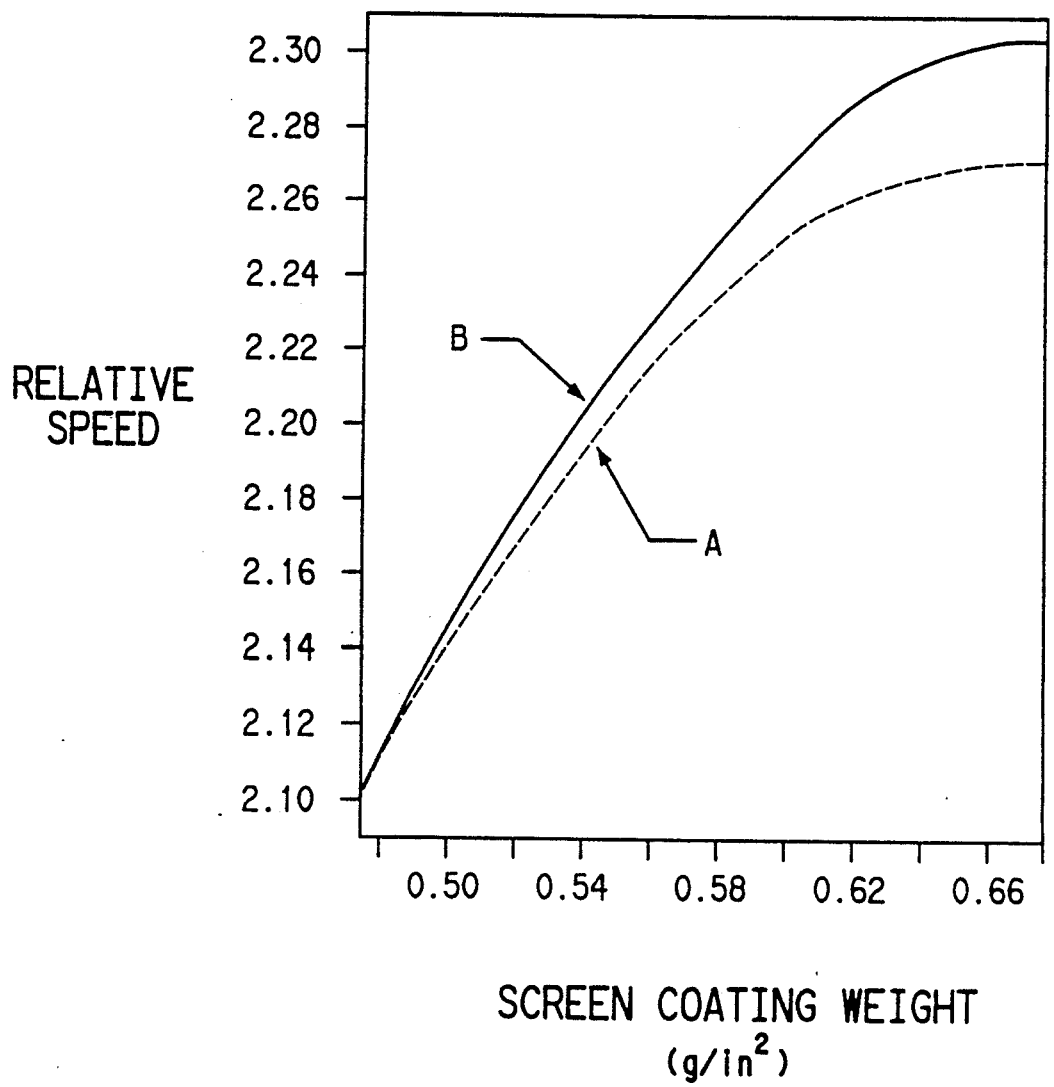
FIG. 2 is a plot similar to FIG. 1 but using thulium activated yttrium tantalate phosphor.

FIG. 1 shows a plot of terbium activated yttrium tantalate phosphor prepared with a standard flux and with a flux containing an effective amount of an alkali metal metasilicate therein. These plots wherein Curve A is the standard, conventionally prepared phosphor and Curve B represents the phosphor prepared by the process of this invention are shown in Relative Speed vs. X-ray Screen Coating Weight ($gm/in^2$). FIG. 2 is similar to FIG. 1 except for using a thulium activated yttrium tantalate phosphor, while FIG. 3 is similar to FIG. 1 except for the use of niobium activated yttrium tantalate phosphor. All of these plots show the improved efficiency that can be obtained using the process of this invention vs phosphor prepared without the addition of the metasilicate to the firing flux.

The M' monoclinic tantalate phosphors of this invention are preferably prepared as described in Brixner U.S. Pat. No. 4,225,623, the disclosure of which is incorporated herein by reference. Thus, during the conventional manner for preparing a tantalate phosphor, stoichiometric amounts of the various oxides are usually blended to form an intimate mixture. This blending may be accomplished in a number of conventional ways. For example, the ingredients may be ball-milled or simply shaken together in some sort of blender. The use of a liquid medium to improve the efficiency of the mixing process such as water, fluorochlorinated hydrocarbons or other such inert fluids, may also be incorporated. Then, to make the X-ray intensifying phosphor of this invention, this mixture of ingredients is also mixed with a suitable flux in which an effective amount of an alkali metal metasilicate is also incorporated. While not being limited to any particular theory, the presence of the alkali metal metasilicate is believed to be a critical member of the flux combination of this invention as attested, for example, by the following reaction which occurs during decomposition of an alkali metal sulfate, e.g., $Li_2SO_4$, a common flux used in the preparation of tantalate phosphors.

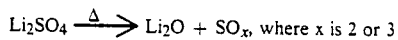

$Li_2SO_4 \xrightarrow{\Delta} Li_2O + SO_x$, where x is 2 or 3

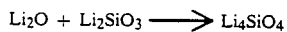

$Li_2O + Li_2SiO_3 \longrightarrow Li_4SiO_4$

It is believed that the addition of alkali metal metasilicate to the flux sequesters alkali metal oxide which may be formed in the course of the firing reaction. After firing in the conventional manner flux and soluble reaction products are removed by water leaching. The luminescent product which has the selected particle size is a tantalate of the M' monoclinic variety is then recovered and is useful for the preparation of an X-ray intensifying screen.

As mentioned previously, there are a host of fluxes capable of producing an alkali metal oxide which can be used to prepare the phosphor described above. These include the alkali metal, e.g., lithium, sodium, potassium, etc., sulfates, phosphates, carbonates, etc. The total flux is present in the reaction mixture in about 30% to about 60% by weight, preferably about 45% to about 55% by weight, based on the total weight of oxide (phosphor starting material). The alkali metal, e.g., lithium, sodium, potassium, etc. metasilicate component of the flux is present in an amount of about 0.1% to about 1.0%, preferably about 0.2% to about 0.6% by weight, based on the total weight of phosphor starting material. A particularly preferred flux is $Li_2SO_4$. To the flux capable of producing an alkali metal oxide is added the alkali metal metasilicate, preferably lithium metasilicate. The mixture of phosphor starting materials, flux with alkali metal metasilicate can be fired, e.g., for at least about three hours, at elevated temperatures, e.g., from 1100° C. to 1400° C., before washing to remove the flux and recovering the phosphor. A preferred temperature range is from 1250° C. to 1300° C.

After the intensifying phosphor is made according to the teachings of this invention, it may be dispersed in any of the commonly known binders, e.g., polyvinyl butyral or the acrylates or methacrylates, using a solvent, e.g., an alcohol, chlorinated hydrocarbon, ketone, butyl acetate, etc. Small amount fumed silica may be present in the phosphor to enhance handling and make the phosphor easier to pour. After dispersing in the binder, the phosphor is then cast on a conventional support, e.g., cardboard, polyester film, thin metal sheets, etc. A brightener may also be present within the phosphor and various reflective materials may be present as an underlayer or within the support itself to enhance the generation of light when the phosphor is struck by X-radiation. $TiO_2$ dispersed in a binder and cast on the support is conventional as well as the use of small particles of rutile $TiO_2$ directly in a film support. All of these procedures are well-known in the art. Over the phosphor layer which has been cast on the support, a conventional protective topcoat may be applied. These topcoats are also well-known in the prior art and serve to protect the rather expensive phosphor layer from stains and defects during the handling thereof. Conventional supports, binders, mixing and coating processes for the manufacture of typical X-ray intensifying screens are, for example, described in Patten U.S. Pat. No. 4,387,141, the pertinent disclosure of which are incorporated herein by reference.

It is conventional to use the intensifying phosphors of this invention as X-ray intensifying screens. These are usually used in pairs in cooperation with double-side coated medical X-ray silver halide photographic film elements, although it is sometimes common to use single-side coated silver halide photographic film elements for some applications. A pair of screens is conventionally used and the coating weights of each screen may be different, if required. Thus, an asymmetric pair of screens can be used to get the best results. Medical X-ray evaluations represent the commercial use for the phosphor of this invention cast into an X-ray intensifying screen. A dimensionally stable, polyethylene terephthalate film support into which small amounts of rutle or anatase titanium dioxide have been incorporated is the preferred support for the phosphor of this invention.

EXAMPLES

This invention will n--w be illustrated by the following specific examples wherein the percentages and parts are by weight:

Example 1

A mixture of 1 mole of tantalum oxide, 0.997 mole yttrium oxide and 0.003 mole of terbium oxide were thoroughly blended with a mixture of 49.5% of lithium sulfate and 0.5% of lithium metasilicate. The flux is present in an amount of 5% based on the total weight of oxide. This mixture was then fired at 1290° C. in air for 12 hours. The lithium salts were then washed from the resultant phosphor with dionized water. After drying, the phosphor was treated by the addition of 0.0002 gm of fumed silica per gm of phosphor to improve the flowability thereof. The phosphor is then dispersed by ball-milling 100 gm of the phosphor in 6 gm of a carboxylated methyl methacrylate acrylic binder with 1 gm of a mixture of a block copolymer of polyoxyethylene and polypropylene glycol, a plasticizer, and dioctyl sodium sulfosuccinate, we ting agent, using a solvent mixture of a 1 to 1 weight mixture of n-butyl acetate and n-propanol. This suspension was coated on 0.010 inch (0.25 mm) polyethylene terephthalate with about 5 mg/cm² $TiO_2$ dispersed therein. The dispersion was coated at various coating weights and the effect on speed tested by exposure to an X-ray source at 70 kVp and 5 mas at a photographic X-ray film to X-ray tube distance of 130 cm. Relative speeds obtained are shown in Curve B of FIG. 1. For control purposes, a similar screen was made using only a lithium sulfate salt as the flux. The relative speed results are shown by Curve A of FIG. 1. These results show that the phosphor prepared with the flux of this invention will have higher relative speed than that prepared with a single, conventional flux.

Example 2

A mixture of 1 mole of tantalum oxide, 0.997 mole of yttrium oxide and 0.003 mole of thulium oxide were blended with the same flux described in Example 1 using the same conditions. Screens were made by coating the washed and dried phosphor on the support described in Example 1. Samples at various coating weights were tested by exposure to photographic films also as described in Example 1. The results, for the phosphor of this invention are shown in Curve B. In Curve A the results of a control using a standard, single flux, are plotted.

Example 3

Another sample of phosphor was prepared in the same manner as described in Example 1. This phosphor was prepared from 0.98 mole of tantalum oxide, 0.02 mole of niobium oxide and 1 mole of yttrium oxide. After firing, washing, drying, blending with a binder and coating at various coating weights on a support, samples of the coatings were used to expose photographic films. The results are shown in FIG. 3 as Curve B while that of a control using a standard, single flux, made at the same time as the invention phosphor is plotted as Curve A.

Example 4

A mixture of 678.2 gm yttrium oxide, 1313.8 gm tantalum oxide and 8.0 gm niobium oxide were mixed in a vibro-rotary mill using alumina cylinders and Freon® TF, E. I. du Pont de Nemours and Co., Wilmington, DE, as the milling fluid. The oxide mixture was dried and combined with a flux mixture consisting of 950 gm lithium sulfate and 50 gm lithium metasilicate. As a control, a 2000 gm mixture of oxides was blended with 1000 gm of lithium sulfate. These mixtures were placed in high purity alumina crucibles, heated to 1290° C. and held at this temperature for 12 hours. After the crucibles had cooled to near room temperature, the fired masses were removed from the crucibles and washed with deionized water until the water tested free of lithium sulfate. The water was removed by filtration and the phosphors were dried. The phosphors were dispersed in a solution of acrylic polymers, wetting agents and solvent as described in Example 1. The phosphor dispersions were coated on reflective substrates so as to give X-ray intensifying screens with various coating weights. The screens were exposed to X-rays as described above and the following results were obtained as shown in the Table below:

TABLE

| Screen Coating Weight | Screen Speed for Various Fluxes | |
|---|---|---|
| | Lithium Sulfate | Lithium Sulfate/ Lithium Metasilicate |
| 0.4 gm/sq in | 1.00 | 1.01 |
| 0.5 gm/sq in | 1.08 | 1.14 |
| 0.6 gm/sq in | 1.10 | 1.24 |

As can be seen from these results, the addition of an alkali metasilicate to the flux results in higher phosphor efficiency. This will mean lower exposure of patients to X-radiation.

I claim:

1. A process for preparing a phosphor with improved X-ray efficiency and purity prepared from a tantalate phosphor having the monoclinic M' structure selected from the group consisting of:
   (a) $YNb_xTa_{1-x}O_4$, where x is 0 to about 0.15;
   (b) $LuNb_xTa_{1-x}O_4$, where x is 0 to about 0.20;
   (c) $Y_{1-y}Tm_yTaO_4$, where y is 0 to about 0.03;
   (d) a solid solution of (a) and (b);
   (e) a solid solution of (a) and (c);
   (f) $Y_{1-y}Tb_yTaP_4$, where y is about 0.001 to about 0.15;
   (g) $Lu_{1-y}Tb_yTaO_4$, where y is about 0.001 to about 0.15;
   (h) $Gd_{1-y}Tb_yTaO_4$, where y is about 0.001 to about 0.15;
   (i) a solid solution of at least two of (f), (g) and (h);
   (j) any of (a) to (i) wherein up to 45 mole percent of the yttrium, lutetium or gadolinium is replaced by lanthanum;
   (k) any of (a) to (i) wherein up to 15 mole percent of the yttrium, lutetium or gadolinium is replaced by ytterbium; and
   (l) any of (a), (b), (c), (d) and (e) wherein up to 15 mole percent of the yttrium or lutetium is replaced by gadolinium;

the process comprising
   (a) intimately mixing stoichiometric quantities of corresponding precursor oxides;
   (b) mixing the resultant mixture with a flux capable of producing an alkali metal oxide wherein said flux also contains an effective amount of an alkali metal metasilicate;
   (c) firing the flux-containing mixture in an inert container in the range of about 1100° C. to about 1400° C. for at least about 3 hours; and
   (d) recovering the phosphor.

2. A process according to claim 1 wherein the total flux mixture is present in about 30% to about 60% by weight based on the total weight of the precursor oxide.

3. A process according to claim 2 wherein the flux capable of producing an alkali metal oxide is selected from the group consisting of alkali metal sulfates, phosphates and carbonates.

4. A process according to claim 2 wherein the flux mixture comprises lithium sulfate and lithium metasilicate.

5. A process according to claim 1 wherein steps (a) and (b) are combined.

6. A process according to claim 2 wherein the alkali metal metasilicate component of the flux is present in an amount of about 0.1% to about 1.0% based on the total weight of precursor oxide.

7. A process according to claim 2 wherein the phosphor is a terbium activated yttrium tantalate.

8. A process according to claim 2 wherein the phosphor is thulium activated yttrium tantalate.

9. A process according to claim 2 wherein the phosphor is niobium activated yttrium tantalate.

10. An X-ray intensifying screen made from the phosphor prepared according to claim 2.

* * * * *